US010723396B2

(12) United States Patent
Parrott et al.

(10) Patent No.: US 10,723,396 B2
(45) Date of Patent: Jul. 28, 2020

(54) MASTER TRACK LINK WITH UNITARY RAIL

(71) Applicant: Caterpillar Inc., Peoria, IL (US)

(72) Inventors: Stan Robert Parrott, Chillicothe, IL (US); Paul Prest, Peoria, IL (US); Arthur James Bland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 220 days.

(21) Appl. No.: 15/847,221

(22) Filed: Dec. 19, 2017

(65) Prior Publication Data

US 2019/0185079 A1   Jun. 20, 2019

(51) Int. Cl.
*B62D 55/21*   (2006.01)

(52) U.S. Cl.
CPC .................. *B62D 55/213* (2013.01)

(58) Field of Classification Search
CPC ..... B62D 55/213; B62D 55/205; B62D 55/21
See application file for complete search history.

(56) References Cited

U.S. PATENT DOCUMENTS

| | | |
|---|---|---|
| 3,427,079 A | 2/1969 | Skromme et al. |
| 4,351,573 A | 9/1982 | Bedis et al. |
| 4,361,364 A | 11/1982 | Brunn |
| 4,579,394 A | 4/1986 | Bedis et al. |
| 4,636,014 A * | 1/1987 | Dennison ............. B62D 55/213 305/186 |
| 6,412,267 B2 | 7/2002 | Duse |
| 6,412,887 B1 | 7/2002 | Ketting et al. |

FOREIGN PATENT DOCUMENTS

| | | |
|---|---|---|
| CN | 201254223 | 6/2009 |
| CN | 103661655 A | 3/2014 |
| DE | 2038144 | 2/1972 |
| DE | 4103424 A1 | 8/1991 |
| EP | 0054879 | 6/1982 |
| JP | S5288836 | 7/1977 |
| WO | 2016056688 | 4/2016 |

OTHER PUBLICATIONS

Machine translation of CN201254223, 2009, 31 pages (Year: 2009).*

* cited by examiner

*Primary Examiner* — Jason R Bellinger
(74) *Attorney, Agent, or Firm* — Law Office of Kurt J. Fugman LLC (57) ABSTRACT

A pair of master track links includes one master track link that has a rail portion that defines a length that is greater than 80% of the length of the body of the master track link.

17 Claims, 5 Drawing Sheets

MASTER TRACK LINK WITH UNITARY RAIL

TECHNICAL FIELD

The present disclosure relates to a method and apparatus for a master track link used for completing a track chain assembly of an endless undercarriage drive employed by earth moving, construction and mining equipment and the like. Specifically, the present disclosure relates to a pair of master track links including a first master track link that has a unitary rail and an extra tooth disposed above the aperture of second master track link that mates with the first master track link.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, a device is typically provided that allows the track chain to be routed about the drive sprocket, idler and support rollers before the free ends of the chain are joined together. This device is called a "master link".

Also, depending on the weight of the machine, the size of the chain, the environment in which the machine operates, and other factors, the chains and/or track shoes may wear or be damaged and may require periodic inspection, servicing, repair, and/or replacement. Hence, a master link may also be provided in the chain to allow disassembly of the chain (i.e., separation of two ends of the chain).

As can be imagined, there can be a great deal of tension on the track chain as the master track links are being mated and assembled to the track chain, and even more tension after the track chain and the pair of master track links have been assembled. This may make the pair of master track links prone to be separated over time. If this separation happens in an unplanned manner, the machine and track will need to be serviced, resulting in loss profits.

Also, master track links typically provide a split rail, intended to support the weight of the machine. More specifically, the rail usually comprises the portions of the pair of master track links that are opposite of where the shoe is typically attached. The rail is usually split, meaning that one side of the rail is formed by one master link while the other side of the rail is formed by the other master link. Since the rail is split, both master links need to be hardened, such as by induction heat treatment, in their respective rail portions to be able to withstand the weight exerted on the track links. Manufacturing and heat treating the master track links can be costly.

Furthermore, some master track links are prone to slippage along a direction that is lateral or perpendicular to the direction that the track chain is traveling. This is undesirable as it may eventually lead to one master track link disengaging the other master track link, which could lead to the disassembly of the track chain undesirably at an unplanned time.

SUMMARY

A pair of master track links that defines a direction of tension and one of the master track links including a tooth and the other master track link defining a recess according to an embodiment of the present disclosure is provided. The pair of master track links may comprise a first master track link including a first body defining a top surface, a bottom surface, a first side surface and a second side surface defining a thickness therebetween, a proximate end and a distal end, and a length therebetween. The first body defines a first bore adjacent the proximate end and includes a first interface region spaced away from the first bore. The first interface region includes one or more catch teeth that is configured to mate with a recess of another master track link to prevent movement along the direction of tension. The first body includes a rail portion that defines a length that is greater than 80% of the length of the first body.

A pair of master track links according to an embodiment of the present disclosure is provided that defines a direction of tension and one of the master track links includes one or more catch teeth and the other master track link defines one or more recesses that are configured to mate with the teeth. The pair of master track links may comprise a first master track link including a first body defining a top surface, a bottom surface, a first side surface and a second side surface defining a thickness therebetween, a proximate end and a distal end, and a length therebetween. The first body defines a first bore adjacent the proximate end, and the first body includes a first interface region spaced away from the first bore including one or more catch teeth disposed in a first zone defined by the body spaced away from the proximate end by a first distance. The zone is also spaced away from the distal end by a second distance, and the first distance and second distance are both 20% or greater of the length from the proximate end to the distal end. The first body includes a forward tooth that is disposed proximate the distal end within another zone defined by the first body that is measured from the distal end to the first zone, wherein one or more catch teeth are configured to mate with one or more recesses of another master track link to prevent movement of one master track link relative to another master track link along the direction of tension.

A pair of master track links according to an embodiment of the present disclosure that includes a first master track link and a second master track link. The pair of track links may comprise a second master track link including a second master track link body defining a top surface, a bottom surface, a first side surface and a second side surface defining a thickness therebetween, a proximate end and a distal end, and a length therebetween. The second master track link body may define a first bore adjacent the proximate end, the first bore defining an axis. The second master track link body includes a second master track link interface region including one or more teeth; and the second master track link interface region defines an aperture including an abutment surface that is configured to engage a tooth of a first master track link, preventing movement of the second master track link along the axis of the first bore.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a master track link will now be described. In some embodiments, the master track link is an offset link that may be used with track chain assemblies already in the field. In other embodiments, the master track link may be a straight link, etc. As used herein, a tooth of one master track link is a feature that is configured to engage a recess or an aperture of another master link, helping to prevent movement of the movement of one master track link relative to another master track link along the direction of travel of a track chain assembly, which may also be referred to as the direction of tension as will be discussed later herein. Accordingly, one or more teeth as described herein may be referred to as a "catch" tooth or "catch teeth".

Figure 1:
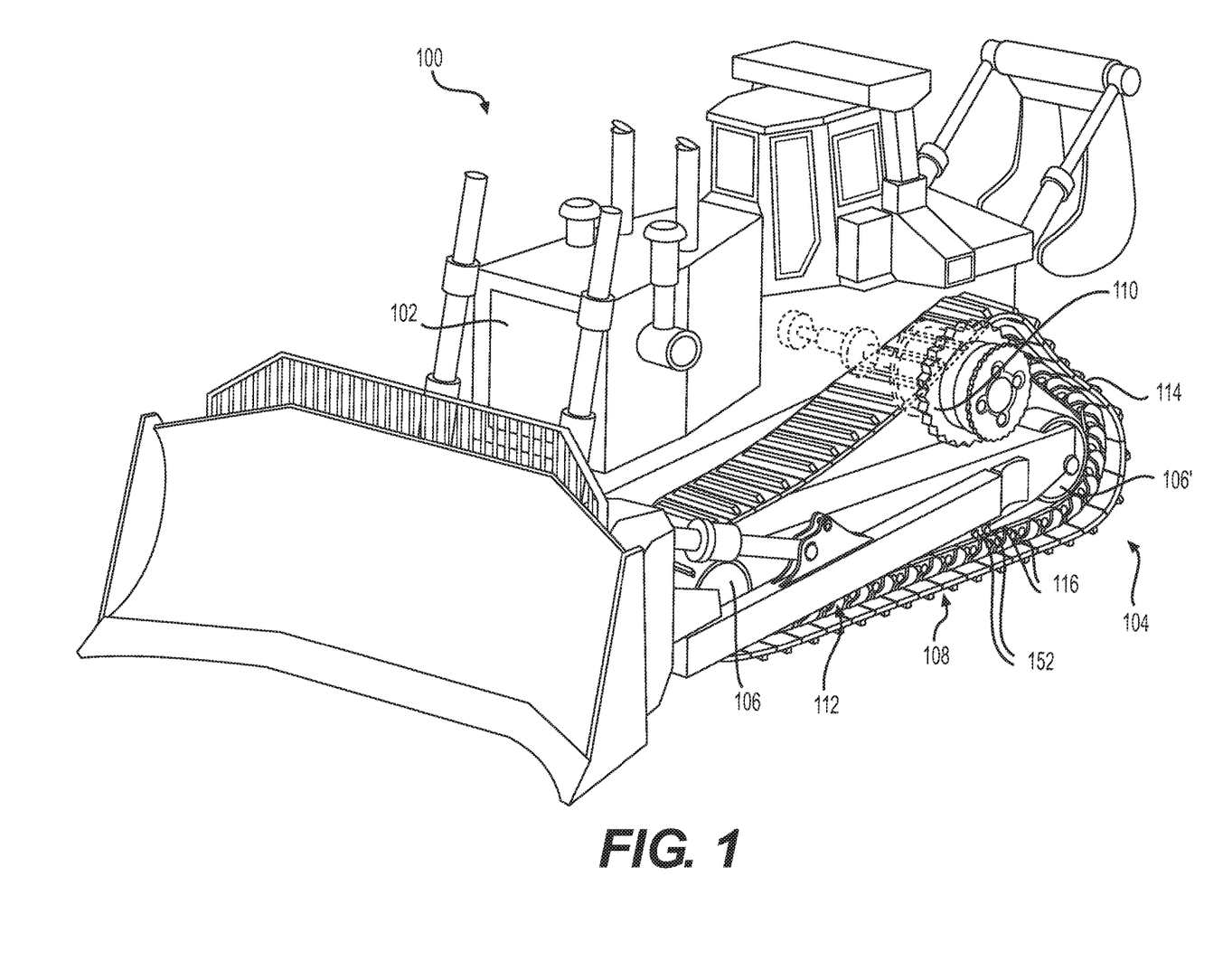
FIG. 1 is a side-view of a machine that may use various track chain assemblies with a master track link according to various embodiments of the present disclosure.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116 and a master link subassembly 200, 300 (not clearly shown in FIG. 1). Support rollers 152 are also provided at the bottom of the track to support the chain.

Figure 2:
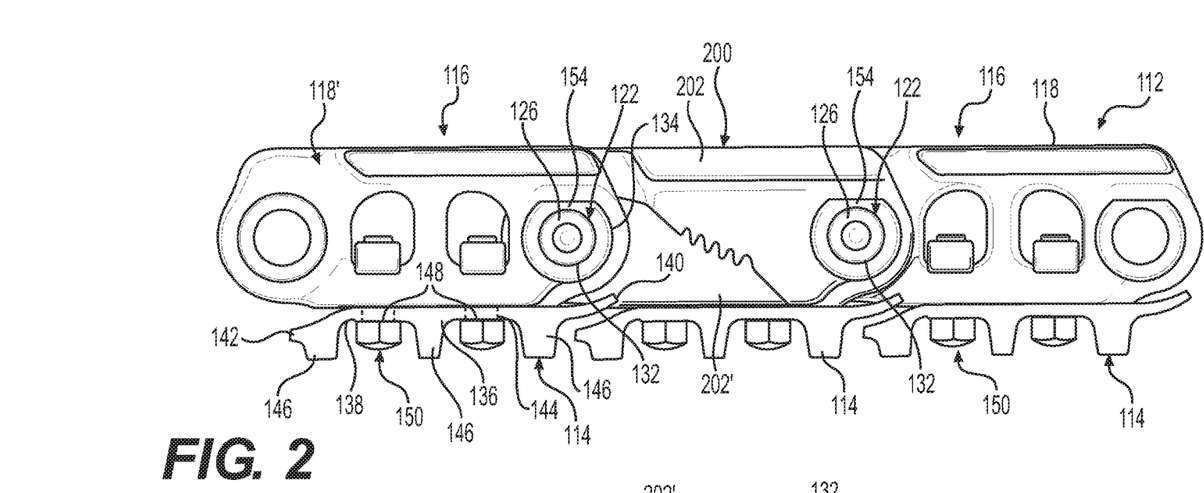
FIG. 2 is a side-view of a track chain assembly of the machine of FIG. 1 removed from the machine.
Figure 3:
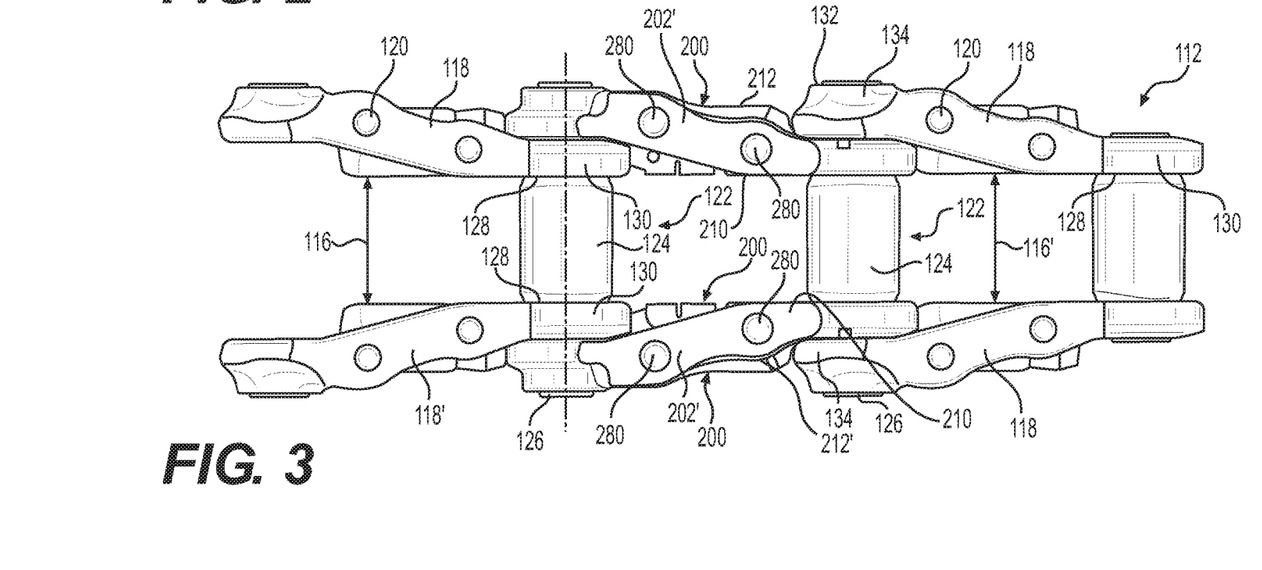
FIG. 3 is a bottom-view illustration of the track chain assembly of FIG. 2.

FIGS. 2 and 3 respectively illustrate side-view and bottom-view perspectives of an exemplary chain assembly 112 and, specifically, a plurality of exemplary link subassemblies 116 and a master link subassembly 200, 300. Each one of link subassemblies 116 may include a respective pair of offset link members 118 or a respective pair of inner and outer links when straight links are used (not shown). Each offset link member 118 may include fastener holes 120, e.g., a threaded hole, configured to receive a fastener 150, e. g., a bolt, or cap screw, to attach a track shoe 114 to a given one of link subassemblies 116. Master track link assembly 200 may include a pair of master track links 202 including a first master track link 202 and a second master track link 202'. The master track link subassembly 200 may be used to complete the chains assembly 112 in a manner that will be further described below herein.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown) that are freely rotatable relative to pin 126, and a pair of seals (not shown) may also be provided in the rod assembly or in one of the link members proximate the rod assembly to prevent the loss of lubrication and provide freedom of movement.

In some embodiments, the bearings and seals may be combined functionally in the same assembly. The bushing 124 may be pressed into an aperture 128 of one end 130 of the offset link member 118 and the pin 126 may extend through this end 130 of the offset link member 118 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. For example, a pin 126 or bushing 124 may be retained by swaging a boss 154 of a link 118, etc. Of course, a plurality of offset link members 118 are connected in a manner similar to what has just been described to form the track chain assembly 112.

More particularly, the first and second rod assemblies 122 may interface with apertures 128, 132 of adjacent offset link members 118, 118' such that consecutively connected link subassemblies 116 may be pivotally interconnected to one another to form the track chain assembly 112. For example, the outer end 134 of one offset link member 118' may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112. Similarly, master track link subassembly 200 may be interconnected between two standard link subassemblies 116 by way of rod assemblies 122.

A track shoe 114 may be connected to each offset link member 118. Each track shoe 114 may include a base portion 136, a ground-engaging surface 138, a leading edge 140, and a trailing edge 142. Each track shoe 114 may also include opposing side edges 144 (only one of which shown in FIG. 2) disposed between leading edge 140 and trailing edge 142. One or more grousers or ribs 146 may be provided to engage the ground, improving traction. Additionally, each track shoe 114 may also include two pairs of threaded shoe holes 148, each pair disposed along a respective one of the side edges 144 and configured to align with a pair of fastener holes 120 associated with an offset link member 118. In some embodiments, holes 148 may be clearance holes and not be threaded.

Typically, each one of shoe holes 114 may correspond to an associated fastener receiving hole 120' situated on the bottom surface of each of the offset link members 118. As such, each track shoe 114 may respectively connect to a pair of opposing pair of offset link members 118 from one side of the track chain assembly to the other side of the track chain assembly shown in FIG. 3. Threaded fasteners 150, such as, for example, bolts or cap screws, may be respectively disposed in each one of shoe holes 148 and fastener receiving holes 120 to fasten a track shoe 114 to a respective pair of opposing offset link members 118. It is contemplated that the spacing of the fastener receiving holes 120 for each offset link member 118 may be substantially similar such that each track shoe 114 may be configured to be connectable to each of offset link members, assuming that each track shoe is also similarly or identically configured.

Turning now to FIGS. 4 thru 8, master track link subassemblies 200, 300 according to various embodiments of the present disclosure are depicted. Focusing on FIGS. 4 thru 6, a master track link subassembly 200 that provides an "anti-walking" feature is illustrated. That is to say, movement of the master track links 202, 202' relative to each other along a direction perpendicular to the direction of tension may be prevented in a direction going into the page of the view of FIG. 4. Other configurations of "anti-walking" features and teeth other than what is specifically shown in the figures are considered to be within the scope of the present disclosure. The first master track link 202 may comprise a first body 204 defining a top surface 206, a bottom surface 208, a first side surface 210 and a second side surface 212 (side surfaces both shown in FIG. 3) defining a thickness therebetween, a proximate end 214 and a distal end 216. The first body 204 may further define a length 205 measured from the distal end 216 to the proximate end 214 along a direction parallel to the direction of tension 266, so called as this is the direction that usually exerts a tension force on the master track link 202 when it is used to assembly a track chain 112. The body 204 may also define a first bore 218 the proximate end 214. This bore 218 may extend from or be at least partially defined by either or both side surfaces 210, 212. As shown, the bore 218 is cylindrical and is a thru-bore but may have another suitable configuration.

Figure 4:
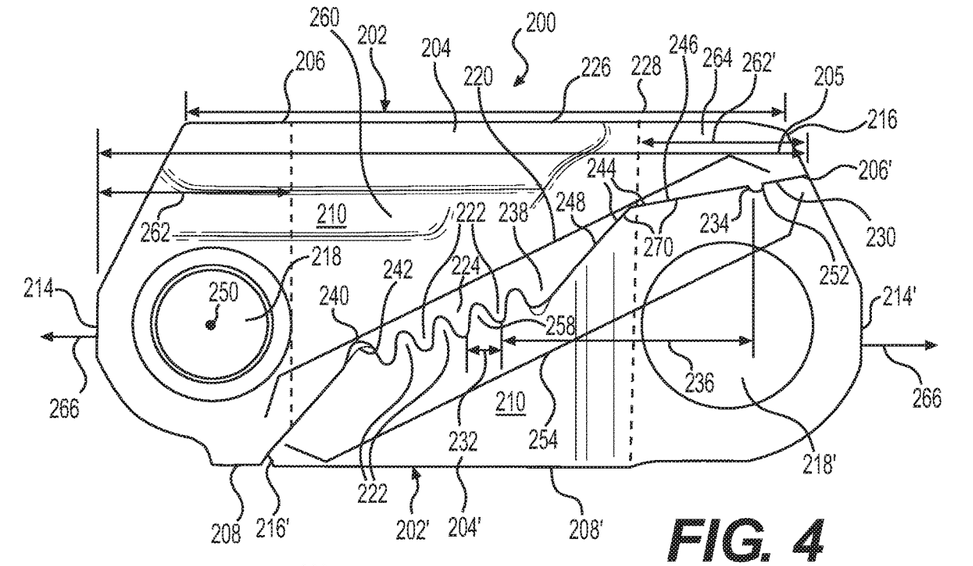
FIG. 4 is a side view of a pair of master track links according to an embodiment of the present disclosure mating with each other removed from the track chain assembly of FIG. 2, shown in a fully mated and assembled configuration. The top master track link has a unitary rail and a small tooth disposed above the aperture of the bottom master track link.

In addition, the first body 204 includes a first interface region 220 spaced away from the first bore, the first interface region 220 including one or more catch teeth 224, such as a first plurality of teeth 222. The catch teeth 224 may be configured to mate with a recess of another master track link to prevent movement along the direction of tension 266. The first body also includes a rail portion 226 that defines a length 228 that is greater than 80% of the length 205 of the first body 204, being measured in like manner as the length 228 of the first body 204. So, when master track link subassembly 200 is assembled as shown in FIG. 4, the split line or seam 230 between the master track links 202, 202' exits the side of the subassembly 200 instead of the top of the subassembly 200. Therefore, a unitary rail is provided instead of a split rail that may be hardened such as by induction heat treatment to the desired hardness. The heat treatment of the second master track link 202' is eliminated or reduced considerably, lowering the cost of manufacturing the master track link subassembly 200. In many embodiments, both master track links are body hardened for strength while the master track link with the unitary rail may also be induction hardened to provide wear resistance.

Figure 5:
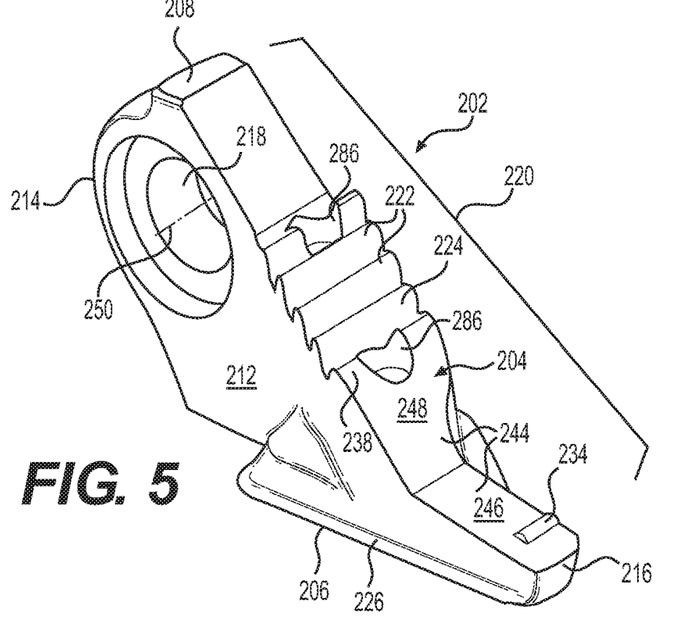
FIG. 5 is a bottom oriented perspective view of the top master track link of FIG. 4 shown removed from the bottom master track link of FIG. 4, more clearly depicting the small tooth. The small tooth does not extend all the way from one side of the master track link to the other. Instead, this tooth is intended to contact a surface of a notch of the bottom master track link to prevent lateral movement, or "walking" of the bottom master track link in a lateral direction.
Figure 6:
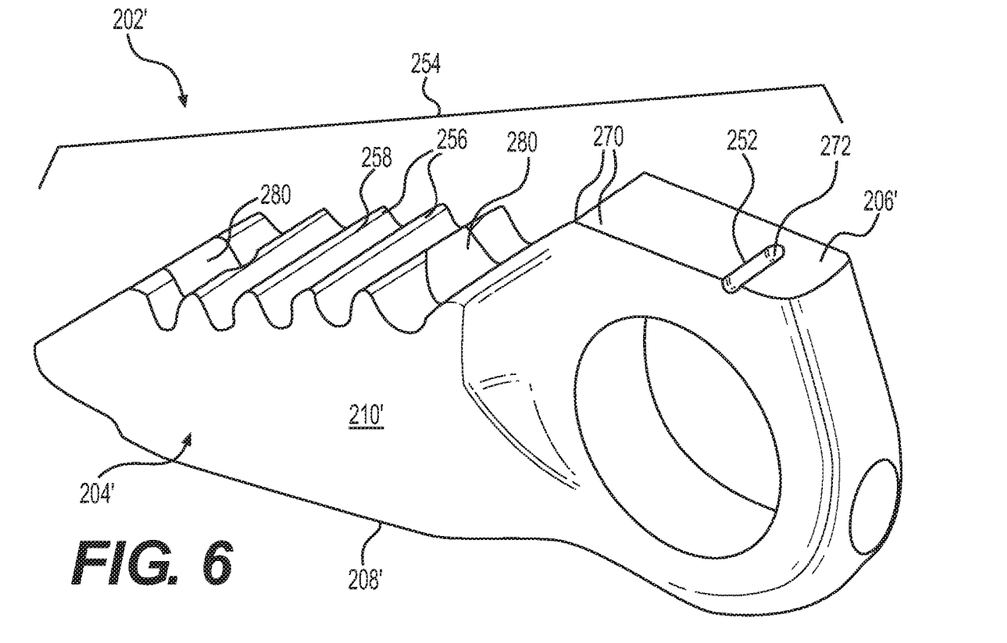
FIG. 6 is a top oriented perspective view of the bottom master track link of FIG. 4 shown removed from the top master track link of FIG. 4, more clearly depicting the notch with an abutment surface that is configured to receive the small tooth of the top master track link.

For the embodiments shown in FIGS. 4 thru 6, the rail portion 226 defines a length 228 that is greater than 85% of the length 205 of the first body 204. Consequently, the rail portion 226 extends over the bore 218 of the first master track link 202 and the bore 218' of the second master track link 202'. The first plurality of teeth 222 are spaced from each other a first distance 232 measured along the direction of tension 226. The first body 204 also includes a forward tooth 234 that is disposed proximate the distal end 216 that is spaced away from the plurality of teeth 222 a second distance 236 that at least three times greater than the first distance 232. These distances 232, 236 are also measured along the direction of tension 266. These distances and various configurations may be varied in other embodiments.

Furthermore, each of the plurality of teeth 222 are identically or similarly configured and the first interface region 220 of the first body 204 further includes a rear tooth 238 that is differently configured than the plurality of teeth 222. More specifically, the rear tooth 238 has generally a ramp configuration and the plurality of similarly or identical teeth 222 includes four or more teeth. The number of teeth, similarity or differences in configuration of the teeth, dimensions of the teeth, etc. may be varied as needed or desired in other embodiments. As shown, the forward tooth 234 is smaller or shorter than the configuration of each of the first plurality of teeth 222. As best seen in FIG. 5, the forward tooth 234 has a half-cylindrical configuration that extends partially through the thickness of the first master track link 202. Any forward tooth discussed herein may be modified as needed or desired in other embodiments. The aperture for receiving the forward tooth (see FIG. 6) may be machined directly onto the master track link by any suitable method such as milling, electrode EDM (electrical discharge machining), etc. The region of any master track link forming a forward tooth or associated aperture may be attached to the master track link via an insert, etc.

In addition, the first interface region 220 defines a series of recesses 240 between each of the plurality of teeth 222 that are at least partially complimentarily shaped to the plurality of teeth 222. Some clearance 242 is provided to facilitate the assembly of the first master track link 202 to the second master track link 202'. More particularly, as the first master track link 202 is mated with the second master track link 202', the teeth 222 of one master track link 202 may more easily fit into the recesses 240 of the other master track link 202' since clearance is provided.

Focusing on FIGS. 4 and 5, the first body 204 includes a bifurcated ramp portion 244 disposed adjacent the distal end 216. The bifurcated ramp portion 244 includes a first ramp portion 246 disposed immediately adjacent the distal end 216 and a second ramp portion 248 disposed between the first ramp portion 246 and the plurality of teeth 222 along the direction of tension 266. The forward tooth 234 is disposed on the first ramp portion 246 and extends from one side of the master track link 202 to approximately half of the thickness of the master track link 202. It is contemplated that the forward tooth 234 may be disposed on the first ramp portion 246, being centered along a lateral direction 250 (lateral direction is parallel to the axis of the bore 218, which is perpendicular to the direction of tension 266) so that the forward tooth 234 does not extend to either side of the master track link 202. In such a case, the aperture 252 on the other master track link 202' may be configured to prevent "walking" of the master track link 202 in a direction into and a direction out of the page of the view of FIG. 4.

With continued reference to FIGS. 4 thru 6, the master track link subassembly 200 further comprises a second master track link 202' including a second body 204' defining a top surface 206', a bottom surface 208', a first side surface 210' and a second side surface 212' defining a thickness therebetween, a proximate end and a distal end 216'. The second body 204' also defines a first bore 218' adjacent the proximate end 214'. The second body 204' includes a second interface region 254 spaced away from the first bore of the second body including one or more catch teeth 258 such as a plurality of teeth 248. The second interface region 254 defines an aperture 252 that is at least complimentarily configured to receive the forward tooth 234 of the first master track link 202. Put into other words, the second interface region 254 may be similarly or identically configured to the first interface region 220, being a mirror image for mating therewith.

With continued reference to FIGS. 4 thru 6, the master track link subassembly 200 may be further described as follows. The first body 204 includes a first interface region 220 spaced away from the first bore including one or more catch teeth 224, such as a first plurality of teeth 222 disposed in a first zone 260 spaced away from the proximate end 214 by a first distance 262 measured along the direction of tension 266. The first zone 260 is also spaced away from the distal end 216 by a second distance 262' measured along the direction of tension 266. The first distance 262 and second distance 262' are both 20% or greater of the length 205 from the proximate end 214 to the distal end 218 measured along the direction of tension 266. The first body 204 includes a forward tooth 234 that is disposed proximate the distal end 216 within a second zone 264 that is measured from the distal end 216 to the first zone 260 along the direction of tension 266. One or more catch teeth may be provided that are configured to mate with one or more recesses of another master track link to prevent movement of one master track link along the direction of tension relative to another master track link.

The second master track link 202' includes a second body 204' with a second interface region 254 including a bifurcated ramp portion 270 complimentarily shaped to the bifurcated ramp portion 244 of the first interface region 220. The bifurcated ramp portion 270 of the second interface region 254 defines an aperture 252 that is at least complimentarily configured to receive the forward tooth 234 of the first master track link 202. The aperture 252 is disposed above the bore 218 of the second body 204' of the second master track link 202' as is the forward tooth 234 of the first master track link 202 once the master track link subassembly 200 is assembled as shown in FIG. 4.

The "anti-walking" features of the master track link subassembly 200 of FIG. 4 may be described as follows. The second master track link interface region 254 defines an aperture 252 including an abutment surface 272 that is configured to engage a tooth 234 of a first master track link 202, preventing movement of the second master track link 202' along the axis of the first bore 218' (e.g., see lateral direction 250). The aperture 252 may be disposed above the bore 218' of the second master track link 202' (in a direction perpendicular to the lateral direction 250 and the direction of tension 266) in some embodiments. The first master track link 202 may include a forward tooth 234 that is configured to abut the abutment surface 272 of the second master track link 202'.

The master track link subassembly may define a direction of tension 266 and the abutment surface 272 may be substantially parallel (i.e. the abutment surface 272 defines a surface normal that is parallel or mostly parallel to the lateral direction 250) to the direction of tension 266. This may help to prevent movement of the first master track link 202 relative to the second master track link 202' along a direction that is perpendicular to the direction of tension 266 (may also be referred to as the direction of travel of the chain). The second master track link interface region 254 may include a second master track link bifurcated ramped region 270 and the first master track link interface region 220 may include a first master track link bifurcated ramped region 244 that is at least complimentarily configured to the second master track link bifurcated ramped region 270, allowing these regions to contact each other. The second master track link bifurcated ramp region 270 includes a convex configuration while the first master track link bifurcated ramped region 244 includes a concave configuration. The angle α formed by the bifurcated ramp regions 244, 270 may vary as needed or desired but may be approximately 140 degrees in some embodiments. This configuration may maintain a suitable wall thickness about the bore 218'. The ramped regions may have other shapes other than flat such as arcuate, etc. in other embodiments.

Figure 7:
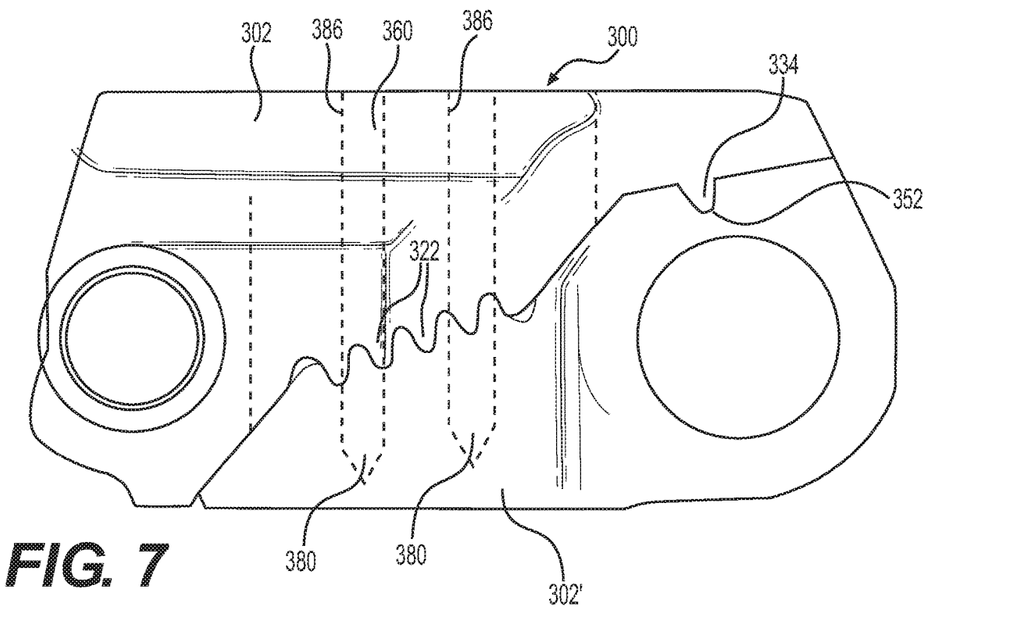
FIG. 7 is a side view of a pair of master track links according to another embodiment of the present disclosure mating with each other removed from the track chain assembly of FIG. 2, shown in a fully mated and assembled configuration. The top master track link has a unitary rail and a large tooth disposed above the aperture of the bottom master track link.
Figure 8:
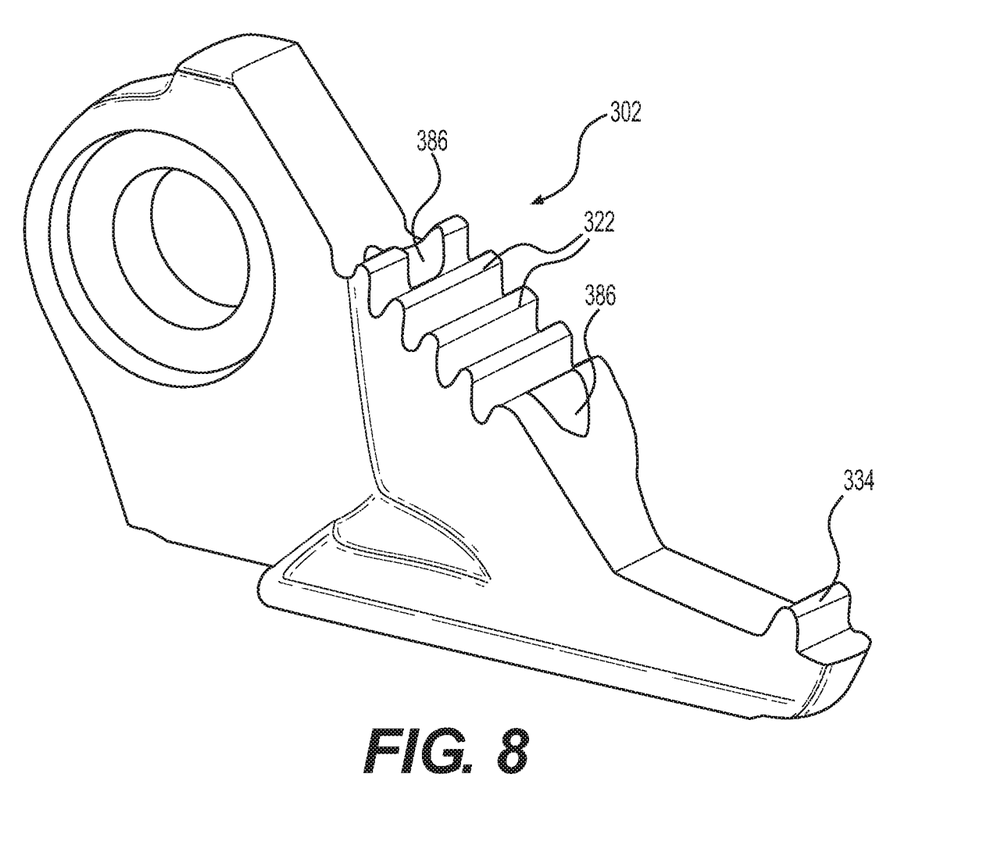
FIG. 8 is a bottom oriented view of the top master track link of FIG. 4 shown removed from the bottom master track link of FIG. 4, more clearly depicting the large tooth. The large tooth extends completely from one side to the other. The bottom master track link would have a complimentarily shaped thru-groove. This embodiment does not prevent lateral movement or provide anti-walking features.

Looking now at FIGS. 7 and 8, a master track link subassembly 300 that is slightly differently configured compared to the embodiments of FIGS. 4 thru 6 is illustrated. As shown, this master track link subassembly 300 is similarly configured to the embodiments of FIGS. 4 thru 6 except for the following differences. The overall size of the links 302, 302' may be greater than those of FIGS. 4 thru 6. The forward tooth 334 may be larger than the forward tooth 234 of FIGS. 4 thru 6. In fact, it may be the same size approximately as the plurality of teeth 322 found near the middle zone 360 of the track links 302, 302' or may actually be slightly larger. Also, the forward tooth 334 extends completely from one side of the master track link 302 to the other side of the master track link 302. The aperture 352 or groove of the second master track link 302 may be a thru-groove. So, no "anti-walking" features may be provided for this embodiment of the present disclosure. However, it is contemplated that the thru-groove may be formed via milling or wire EDM, providing tapered walls so that the groove gets progressively smaller from one side of the master track link to the other side. The associated forward tooth may be complimentarily constructed, preventing the forward tooth from entering the groove on side and exiting the other side. This too may provide an "anti-walking" feature if so desired.

Also, any of the threaded holes 280, 380 may be at least partially defined by hardened material that forms the rail portions of the links 202, 302, providing suitable support and wear resistance for handling the weight of the machine and its payload. Clearance holes 286, 386 may also be provided that are aligned with the threaded holes 280, 380 to allow fasteners 150 to pass to access and mate with the threaded holes 280, 380.

INDUSTRIAL APPLICABILITY

In practice, a master track link, a pair of master track links, a chain using a master track link or a pair of track links, or a master track link subassembly according to any embodiment described herein may be sold, bought, manufactured or otherwise obtained in an OEM or after-market context. More specifically, any of the embodiments may have a unitary rail, a forward tooth, or an anti-walking tooth, either separately, or in combination as needed or desired.

A master track link 202, 302 or master track link subassembly 200, 300 may be attached to the free end of a chain assembly 112 at the factory and sold as a replacement part or already installed on a machine such as shown and described previously with respect to FIG. 1. Completing the chain assembly 112 simply requires the user to align the master track links 202, 302 and fastening them together.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A pair of master track links that defines a direction of tension and one of the master track links including a tooth and the other master track link defining a recess, the pair of master track links comprising:
   a first master track link including
      a first body defining a top surface, a bottom surface, a first side surface and a second side surface defining a thickness therebetween, a proximate end and a distal end, and a length therebetween; wherein
      the first body defines a first bore adjacent the proximate end;
      the first body includes a first interface region spaced away from the first bore along a direction parallel to the direction of tension, the first interface region including one or more catch teeth that is configured to mate with the recess of another master track link; and
      the first body includes a rail portion that defines a rail portion length that is greater than 80% of the length of the first body;
      wherein the one or more catch teeth of the first interface region includes a first plurality of teeth that are spaced from each other a first distance along a direction that is parallel to the direction of tension, and the first body includes a forward tooth that is disposed proximate the distal end that is spaced away from the plurality of teeth a second distance along a direction that is parallel to the direction of tension that is at least three times greater than the first distance; and
      the first body includes a bifurcated ramp portion disposed adjacent the distal end, the bifurcated ramp portion including a first ramp portion disposed immediately adjacent the distal end and a second ramp portion disposed between the first ramp portion and the plurality of teeth, and the forward tooth is disposed on the first ramp portion.

2. The pair of master track links of claim 1 wherein the first body includes the rail portion length that is greater than 85% of the length of the first body.

3. The pair of master track links of claim 1 wherein each of the plurality of teeth are identically configured and the first interface region of the first body further includes a rear tooth that is differently configured than the plurality of teeth.

4. The pair of master track links of claim 3 wherein the plurality of teeth includes four teeth.

5. The pair of master track links of claim 3 wherein the first interface region defines a series of recesses between each of the plurality of teeth that are at least partially complimentarily shaped to the plurality of teeth.

6. The pair of master track links of claim 5 further comprising:
   a second master track link including
      a second body defining a top surface, a bottom surface, a first side surface and a second side surface defining a thickness therebetween, a proximate end and a distal end;
      the second body defines a first bore adjacent the proximate end;
      the second body includes a second interface region spaced away along a direction that is parallel to the direction of tension from the first bore of the second body including a plurality of teeth; and the second interface region defines an aperture that is at least complimentarily configured to receive the forward tooth of the first master track link.

7. A pair of master track links that defines a direction of tension and one of the master track links including one or more catch teeth and the other master track link defines one or more recesses that are configured to mate with the teeth, the pair of master track links comprising:
a first master track link including
a first body defining a top surface, a bottom surface, a first side surface and a second side surface defining a thickness therebetween, a proximate end and a distal end, and a length therebetween; wherein
the first body defines a first bore adjacent the proximate end; and
the first body includes a first interface region spaced away along a direction that is parallel to the direction of tension from the first bore including one or more catch teeth disposed in a first zone defined by the body spaced away from the proximate end by a first distance along a direction that is parallel to the direction of tension, the zone also being spaced away from the distal end by a second distance along a direction that is parallel to the direction of tension, and the first distance and second distance are both 20% or greater of the length from the proximate end to the distal end; and
the first body includes a forward tooth that is disposed proximate the distal end within another zone defined by the first body that is measured from the distal end to the first zone;
wherein the first body includes a bifurcated ramp portion disposed adjacent the distal end, the bifurcated ramp portion including a first ramp portion disposed immediately adjacent the distal end and a second ramp portion disposed between the first ramp portion and the plurality of teeth, and the forward tooth is disposed on the first ramp portion.

8. The pair of master track links of claim 7 wherein the one or more catch teeth includes a plurality of teeth that are identically configured and the first interface region of the first body further includes a rear tooth that is differently configured than the plurality of teeth.

9. The pair of master track links of claim 8 wherein the plurality of teeth includes four teeth.

10. The pair of master track links of claim 8 wherein the first interface region defines a series of recesses between each of the plurality of teeth that are at least partially complimentarily shaped to the plurality of teeth.

11. The pair of master track links of claim 7 wherein the first body further includes a rail portion that defines a rail portion length that is greater than 80% of the length of the first body.

12. The pair of master track links of claim 11 wherein the rail portion length is greater than 85% of the length of the first body.

13. The pair of master track links of claim 7 further comprising:
a second master track link including
a second body defining a top surface, a bottom surface, a first side surface and a second side surface defining a thickness therebetween, a proximate end and a distal end; wherein
the second body defines a first bore adjacent the proximate end;
the second body includes a second interface region spaced away along a direction that is parallel to the direction of tension from the first bore of the second body, the second interface region including one or more catch teeth; and
the second interface region includes a bifurcated ramp portion complimentarily shaped to the bifurcated ramp portion of the first interface region, the bifurcated ramp portion of the second interface region defining an aperture that is at least complimentarily configured to receive the forward tooth of the first master track link, the aperture being disposed above the first bore of the second body of the second master track link along a direction that is perpendicular to the direction of tension.

14. A pair of master track links comprising:
a first master track link; and
a second master track link including
a second master track link body defining a top surface, a bottom surface, a first side surface and a second side surface defining a thickness therebetween, a proximate end and a distal end, and a length therebetween; wherein
the second master track link body defines a first bore adjacent the proximate end, the first bore defining an axis;
the second master track link body includes a second master track link interface region including one or more teeth; and
the second master track link interface region defines an aperture including an abutment surface that is disposed between the first side surface and the second side surface along a direction that is parallel to the axis of the first bore such that the aperture is blind along the direction that is parallel to the axis of the first bore.

15. The pair of master track links of claim 14 wherein the first master track link includes a first master track link body including a first master track link interface region, and a forward tooth that is configured to abut the abutment surface of the second master track link.

16. The pair of master track links of claim 15 wherein the pair of master track links define a direction of tension and the abutment surface is substantially parallel to the direction of tension.

17. The pair of master track links of claim 16 wherein the second master track link interface region includes a second master track link bifurcated ramped region and the first master track link interface region includes a first master track link bifurcated ramped region that is at least complimentarily configured to the second master track link bifurcated ramped region, the second master track link bifurcated ramp region includes a convex configuration, the first master track link bifurcated ramped region includes a concave configuration, and the aperture of the second master track link interface region is disposed above the first bore of the second master track link along a direction that is perpendicular to the direction of tension and the axis of the first bore.

* * * * *